United States Patent [19]

Yonezawa

[11] 4,210,168
[45] Jul. 1, 1980

[54] PRESSURE-RESPONSIVE VALVE UNIT FOR A FLUID CONTAINER

[75] Inventor: Keitaro Yonezawa, Kobe, Japan

[73] Assignee: Kabushiki Kaisha Neriki, Amagasakishi, Japan

[21] Appl. No.: 950,682

[22] Filed: Oct. 12, 1978

[30] Foreign Application Priority Data

Oct. 17, 1977 [JP] Japan .............................. 52-139645
Aug. 28, 1978 [JP] Japan .............................. 53-118137

[51] Int. Cl.² ............................................. F16K 15/02
[52] U.S. Cl. ................................ 137/454.5; 137/495; 137/496; 137/614.2; 141/18; 141/349; 251/149.4; 137/509
[58] Field of Search ..................... 137/226, 322, 454.5, 137/495, 496, 507, 509, 523, 614.2, 614.21; 251/149.4, 149.6; 141/18, 21, 349; 222/3

[56] References Cited

U.S. PATENT DOCUMENTS

| 2,645,241 | 7/1953 | Riede | 141/18 |
| 2,989,971 | 6/1961 | Valentine | 137/509 X |
| 3,389,796 | 6/1968 | Fiala | 137/509 X |

FOREIGN PATENT DOCUMENTS 608881 9/1948 United Kingdom ..................... 137/509

Primary Examiner—Robert G. Nilson
Attorney, Agent, or Firm—Schwartz, Jeffery, Schwaab, Mack, Blumenthal & Koch

[57] ABSTRACT

A pressure-responsive valve unit is received in the cavity of a valve assembly housing, the inner end of the cavity being connected with a fluid container. The valve unit includes a main body having a chamber containing a check valve body that is movable toward and away from engagement with a valve seat on the main body, the valve seat facing the check valve body and the inlet end of the cavity, and the main body having passage means communicating fluid from the container to the front end portion of the check valve body. The check valve body is biased into engagement with the valve seat by a spring, the force of which is adjustable with a plug threaded into the inner end of the main body chamber. An outlet bore extends from the outer end of the main body to the valve seat, and the check valve body is engageable by a push rod inserted through said outlet bore.

9 Claims, 8 Drawing Figures

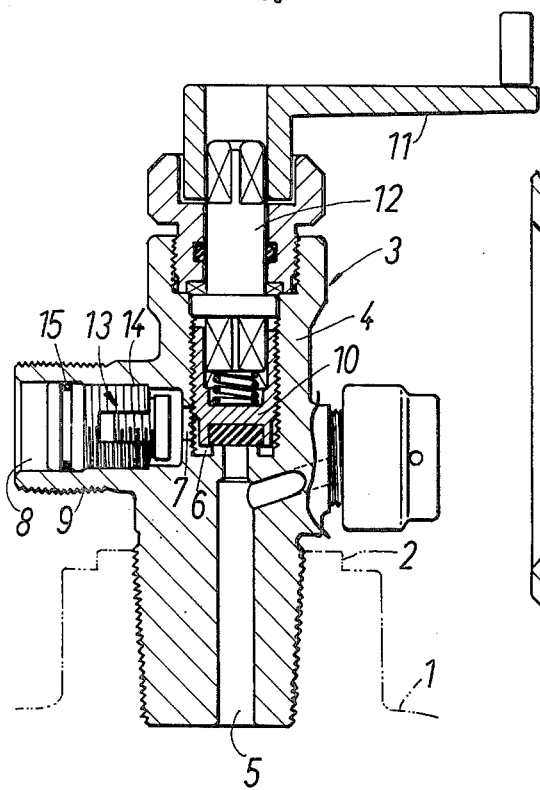
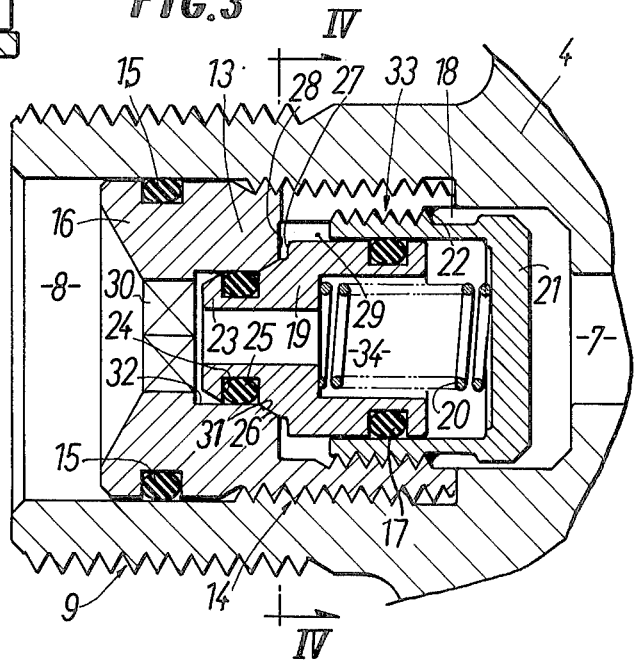
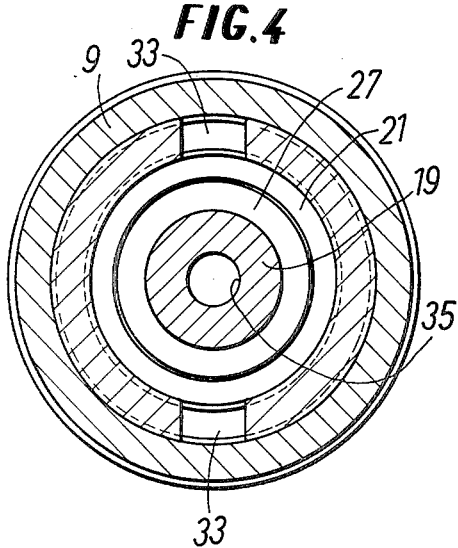
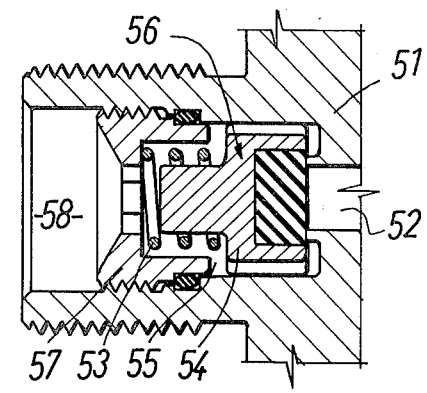
FIG. 1 PRIOR ART

4,210,168

PRESSURE-RESPONSIVE VALVE UNIT FOR A FLUID CONTAINER

TECHNICAL FIELD OF THE INVENTION

The present invention relates generally to valve arrangements for use in controlling the flow of fluid out of and into a container. More specifically, it relates to a pressure-responsive valve unit connectable to a fluid container opening, designed to open for releasing fluid from the container when the pressure within the container as applied to the valve unit exceeds a preselected value, and to close when such pressure falls below the preselected value so that impurities such as outside air, dirt, oil, fumes and the like cannot intrude into the container.

BACKGROUND OF THE PRIOR ART

A common arrangement for controlling the flow of fluid from a container is to use a valve that can be opened and closed by hand. It frequently happens that the valve cock of such a valve is left open, carelessly or on purpose, to allow the fluid to discharge while the operator is attending to other work. If the pressure within the container falls sufficiently while the valve cock is open, because the container has been emptied or for other reasons, it is possible for impurities to intrude into the container through the open valve cock. The impurities, such as outside air, dirt, oil, fumes and the like, can cause contamination of any fluid remaining within the container, or of the container itself. When this occurs, the container may need to be purged, with the remaining fluid removed either by substitution or perhaps vacuum suction and, in some instances, cleaning of the container itself may be required before it can again be placed in use. These curative procedures are costly in both time and labor.

In order to solve this intrusion problem, many proposals have been made, among which a seemingly effective approach is to provide the container with a check valve capable of closing in response to a reduction of pressure within the container below a preselected value. This can avoid a possible intrusion of outside, contaminating foreign matter into the container while it is being emptied; one pressure responsive valve for this purpose being the subject of U.S. Pat. No. 3,809,117. While the valve of this patent constitutes an advance in the art, it nevertheless leaves some aspects of the problem unsolved.

A valve unit used to solve the problem of intrusion should be designed so that the container can be easily filled with fluid through the valve and, at the same time, it must be designed to open properly for emptying fluid and close when pressure within the container falls below a preselected value. Further, it is desirable that the pressure-responsive valve unit be designed so that its operating pressure can be preset before it is installed on the container; the unit should lend itself to easy disassembly and repair. No pressure-responsive valve heretofore proposed for container use has successfully solved all of these problems and, thus, the need for an improved pressure-responsive valve exists. The present invention is intended to satisfy that need.

SUMMARY OF THE INVENTION

The pressure-responsive valve unit of the present invention has the appearance of an externally threaded cartridge, and is designed to be installed within an internally threaded cavity connected with a container. The cavity is preferably supplied with fluid from the container through a conventional flow control valve of suitable design. The valve unit includes a sleeve-like main body having a central outlet bore in its outer end and slot fluid inlet passages in its inner end. The main body contains a chamber within which a check valve body is slidably mounted, the check valve body having a central bore therethrough that is in communication with the outlet bore in the main body. The forward end of the check valve body is engageable with a seat provided within the chamber about the main body outlet bore, and a spring is disposed between the rear end of the check valve body and a cup-shaped adjuster plug which is threaded into the inner end of the sleeve-like main body. Fluid enters the valve unit through the slot passages in the sleeve-like main body and, when the pressure of the fluid is sufficiently great, it acts to unseat the check valve body against the force of the spring to establish flow from the container.

The operating pressure for the valve unit is preset by adjusting the position of the adjuster plug. This can be done apart from the container, which is one of the advantages of the present invention over the prior art. When pressure within the container, as applied to the valve unit, falls below the preset operating pressure for the valve unit, the spring is effective to move the check valve body to its closed position.

In order to enable easy filling of the conatiner, the outlet bore in the main body of the valve unit is aligned with the outlet of the cavity within which the unit is mounted, and the check valve body is aligned with the outlet bore and arranged so that it can be engaged by a tool passed from outside the valve unit through the outlet bore. With this arrangement, it is a simple matter to connect a filling device to the cavity, the filling device being provided with a push rod that passes through the outlet bore of the main body, engages the check valve body, and unseats it against the force of the spring. Thereafter, fluid can be freely admitted to the container through the valve unit, and the entire operation is accomplished without damaging or requiring disassembly of the pressure-responsive valve unit of the invention.

To facilitate installation and removal of the valve unit within its cavity, the outlet bore of the main body is irregular in shape, say hexagonal, so that it can receive a suitable turning tool.

In a modification of the invention, the check valve body is provided on its front portion with a cam surface that confronts a pin carried by the valve unit main body, and the central bore of the check valve body has an irregular shape so that it will accept a turning tool. By using a turning tool, the check valve body can then be rotated within its chamber, with the cam surface riding on the projecting pin, whereby the check valve can be opened against the force of the spring. It will remain open until the check valve body is turned in the opposite direction. This arrangement enables free access to the container if such is desired.

It is the principal object of the present invention to provide a pressure-responsive valve unit for the opening of a fluid container, designed to overcome problems associated with prior valve units designed for this purpose.

Another object is to provide a pressure-responsive valve unit capable of closing in response to a reduction in fluid pressure within a connected container to a value below a preselected operating value, whereby outside foreign matter is then prevented from entering the container.

A further object is to provide a pressure-responsive valve unit of the type described, designed so that it can be easily opened by an operator when it is necessary to perform container filling operation.

Yet another object is to provide a pressure-responsive valve unit for a fluid container, designed so that its operating pressure value can be easily set before the unit is connected with the container.

It is also an object of the invention to provide a valve unit of the type described, which is simple in construction, easy to mount, and which can be readily assembled and disassembled.

Other objects and many of the attendant advantages of the invention will become readily apparent from the following description of the preferred embodiments when taken in conjunction with the accompanying drawings.

BRIEF DESCRIPTION OF THE DRAWINGS

The following preferred embodiments of the invention are described with the aid of the attached drawings, wherein:

FIG. 1 shows a Prior Art valve unit in axial section for use in withdrawing fluid from a container;

FIG. 2 is a sectional view through a valve assembly constructed according to a first embodiment of the present invention, a container being shown by phantom lines and the valve unit of the invention being installed within its cavity;

FIG. 3 is an enlarged, longitudinal sectional view of the pressure-responsive valve unit of FIG. 2;

FIG. 4 is a cross-sectional view, taken along the line IV—IV in FIG. 3;

FIG. 5 is a view similar to FIG. 3, but showing the check valve body shifted to its open position;

DESCRIPTION OF THE PREFERRED EMBODIMENTS

Figure 6:
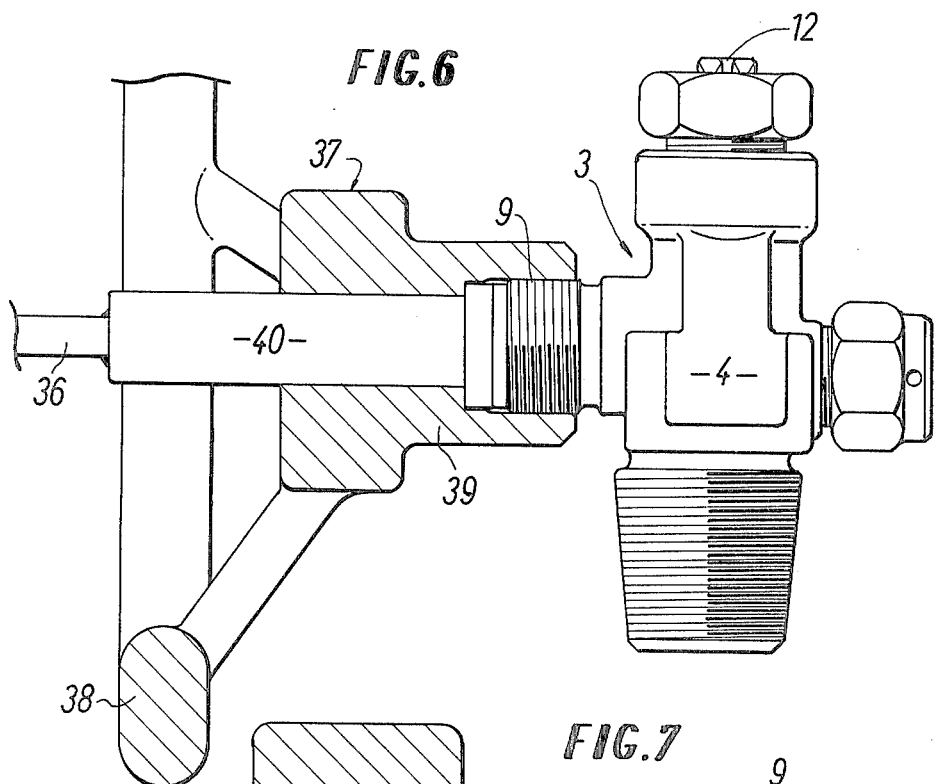
FIG. 6 is a side elevational view, partly in section, showing a filling device attached to the valve unit of the invention.

In order to better explain the background of the present invention, reference is first made to FIG. 1, wherein is shown a typical example of prior art valve used for preventing foreign matter from entering a connected container when the pressure within the container has fallen below a selected value. In FIG. 1, a valve unit is indicated generally at 56 and includes an outer casing 51 containing a valve chamber 55 in which a check valve body 54 is accommodated in such a manner as to be movable away from a seat provided about an inlet 52, against the force of a spring 53. A spring-pressure adjuster pug 57 is threadably received in the outer end of the valve chamber 55 and has a cnetral outlet bore therethrough provided with an irregular shape so that it can receive a suitable turning tool. The plug 57 engages the spring 53, and the pressure exerted by the spring is adjusted by threading the plug inwardly or outwardly until the valve unit 56 is set to respond to the desired opening fluid pressure.

When pressure within the container connected to the valve unit 56 exceeds the setting of the spring 53, the valve body 54 will shift to the left, as viewed in FIG. 1, and fluid will flow through longitudinal passages provided in the periphery of the valve body 54 and out through the central bore in the adjuster plug 57. After pressure within the container falls to a value below the setting of the spring 53, the valve unit 56 will close to prevent the entry of foreign matter into the container. In this way, the valve body 54 is moved either in the opening direction or in the closing direction, in accordance with the value of the pressure in the container.

While the arrangement of FIG. 1 is functional for many uses, it has disadvantages that are typical of those encountered in the prior art, as follows:

(a) When it is desired to supply fresh fluid to the container, it is necessary to keep the valve unit 56 in an open condition, with the valve body 54 shifted to the left in FIG. 1 against the force of the spring 53. This requires a special tool (not shown) for engaging and pulling the valve body 54. The result is a rather complicated arrangement, involving substantial labor and cost, which produces an inefficient filling operation.

(b) Turning of the adjuster plug 57 within its chamber requires a special tool, and setting of the valve response pressure must be done while the valve unit 56 is connected with the container. This can be time consuming and requires a degree of skill beyond that of the normal laborer.

(c) Rather close tolerances must be obtained in manufacture, and care is required when setting the position of the adjuster plug and making repairs to avoid thread damage and damage to the seat and other elements of the valve.

(d) Because the adjuster plug 57 must be set after the valve unit is connected to the container, the operator needs to handle the container assembly as a whole. This can require a relatively large working force, involve awkward movements, and place an undue burden on the operator.

The valve unit of the present invention overcomes all of these problems, and reference is now made to FIGS. 2–7 of the drawings, wherein a container valve assembly 3 is shown attached to a fluid container 1 through a threaded collar 2. The container valve assembly 3 includes a valve casing 4 provided with an inlet bore 5, a central chamber 6, an outlet bore 7 and a cylindrical cavity 8 contained within an externally threaded cylindrical arm 9 of the casing.

A pressure-responsive valve unit 13, constructed according to the first embodiment of the invention, is mounted within the cavity 8, and the axes of the inlet bore 5 and the cavity intersect and are disposed at right angles to one another. Fluid follows a path from the container 1 through the inlet bore 5 into the central chamber 6 of the valve casing 4 and then through the outlet bore 7 into the cavity 8 where it impinges on the inner end of the valve unit 13. When the container is being filled through the casing arm 9, with the valve unit 13 held in an open position, fluid flow is of course in the opposite direction.

Received in the central chamber 6 is an externally threaded main valve core 10, which is movable into and out of engagement with a seat surrounding the inner end of the inlet bore by a rotatable shaft 12 connected thereto. The shaft 12 is rotated by a handle 11, which is detachably connected with the projecting upper end thereof to move the valve core 10 between its open and closed positions, whereby the flow of fluid into and out of the container 1 is controlled.

The pressure-responsive valve unit 13 of FIGS. 2-7 includes a sleeve-like main body 16 having internal and external threads on its inner end portion, the external threads thereon being engageable with threads 14 provided on the inner end portion of the cylindrical wall of the cavity 8. The outer end portion of the cylindrical cavity wall is unthreaded, as is the outer end portion of the main body 16, and the latter has an annular groove therein within which an O-ring 15 is carried for establishing a fluid seal.

The main body 16 contains a chamber terminating at its forward end in an annular radial wall 28 which surrounds a frusto-conical valve seat 31, the latter being connected by a cylindrical bore 32 to a reduced diameter outlet bore 30 having an irregular shape, say hexagonal, for receiving a turning tool that is used to thread the valve unit 13 into and out of the cavity 8. Diametrically opposed, elongated passages 33 are provided in the inner end portion of the sleeve-like main body 16, for conducting fluid to and from the chamber within the main body. The number of slot passages employed can of course be varied, as can their location.

Received within the chamber provided in the sleeve-like main body 16 is a check valve body 19, held within the chamber by a cup-shaped adjuster plug 21 that is threaded into the rear end portion of the main body. The check valve body has a cylindrical outer surface provided with an annular groove in which an O-ring 17 is received, the O-ring 17 forming a fluid seal with the cylindrical side wall of the cup-threaded plug 21. p The forward end 23 of the check valve body 19 has an annular groove 24 therein, which receives an O-ring 25. A tapered abutment face 26 extends rearwardly from the annular groove 24 and is shaped complementary to the frusto-conical valve seat 31. When the check valve body 19 is moved forwardly the forward end 23 thereof enters the cylindrical bore 32 until the abutment face 26 engages the seat 31, as shown in FIG. 3, with the O-ring 25 forming a fluid seal with the cylindrical wall of the bore 32.

The check valve body contains an enlarged cylindrical chamber 34 in its rear end, terminating at its forward end in an annular radial wall that surrounds a cylindrical bore 35. A coil spring 20 is received within the chamber 34, and is engaged by the adjuster plug 21.

Referring again in particular to FIG. 3, it will be noted that the abutment face 26 terminates in an annular, radial wall 27, which is spaced from the annular radial wall 28 when the face 26 is seated on the seat 31. Further, an annular space 29 is formed between the check valve body 19, the sleeve-like main body 16 and the adjuster plug 21, which serves to communicate the space between the radial walls 27 and 28 with the slot passages 33. Finally, the diameter of the rear end of the adjuster plug 21 is substantially less than the inner diameter of the cavity 8, whereby a fluid passage is established between the outlet bore 7 and the slot passages 33.

The pressure-responsive valve unit 13 of the invention functions as follows. Assume that the container 1 contains fluid under a pressure greater than the setting of the spring 20. When the handle 11 is operated to open the main valve core 10, fluid flows from the outlet bore 7 into the cavity 8, passes through the passages 33 and the flow space 29, and acts upon the radial wall 27 to shift the check valve body 19 to the right in FIG. 3 against the force of the spring 20 until the "open" position shown in FIG. 5 is obtained. Thereafter, fluid will flow through the valve unit 13 and out the outlet bore 30.

Should the pressure of fluid within the container fall below the setting of the spring 20, the spring will be effective to shift the check valve body 19 to the left, closing off flow through the valve unit 13. Thus, intrusions into the container 1 are prevented.

The chamber 34 within the check valve body 19 is in communication through the bore 35 with the outlet bore 30 of the main body 16, so that the chamber 34 will receive a possible counterflow of fluid from outside the container 1 that might occur while fluid is being discharged from the container. If this should occur, such back pressure within the chamber 34 will help the spring close the valve unit 13, preventing backflow into the container. This can be of particular advantage when a plurality of containers containing different kinds of fluids are jointly employed to obtain a mixture of gases. In such cases, it often happens that the pressure of fluid in one container will be lower than the internal pressure in the common pipe, which is likely to cause a fluid taken from another container to flow into the container with the low pressure. With the pressure-responsive valve unit 13 of the invention, such backflows will be prevented.

The pressure setting for the valve unit 13 is achieved by simply threading the adjuster plug 21 into or out of the sleeve-like main body 16 and, once the desired response is obtained, the adjuster plug 21 is fixed in place by adhesive 22 between it and the main body 16. The response pressure for the valve unit 13 is set before it is installed in the cavity 8, thus minimizing the need for operator sill on site and lessening the chance thread damage will occur. The valve unit 13 is merely threaded into a suitable jig, for example, with the slot passages 33 having access to a known pressure source of the desired value. The adjuster plug 21 is then turned until the spring 20 places the desired pressure on the check valve body 19.

It will be noted that the diameter of the central bore 35 in the check body 19 is substantially smaller than the diameter of the outlet bore 30 in the main body 16, so that the end face of the check valve body is exposed to the outlet bore 30. Advantage of this arrangement is taken to operate the valve unit mechanically, when it is desired to fill the container 1 through the casing arm 9.

Figure 7:
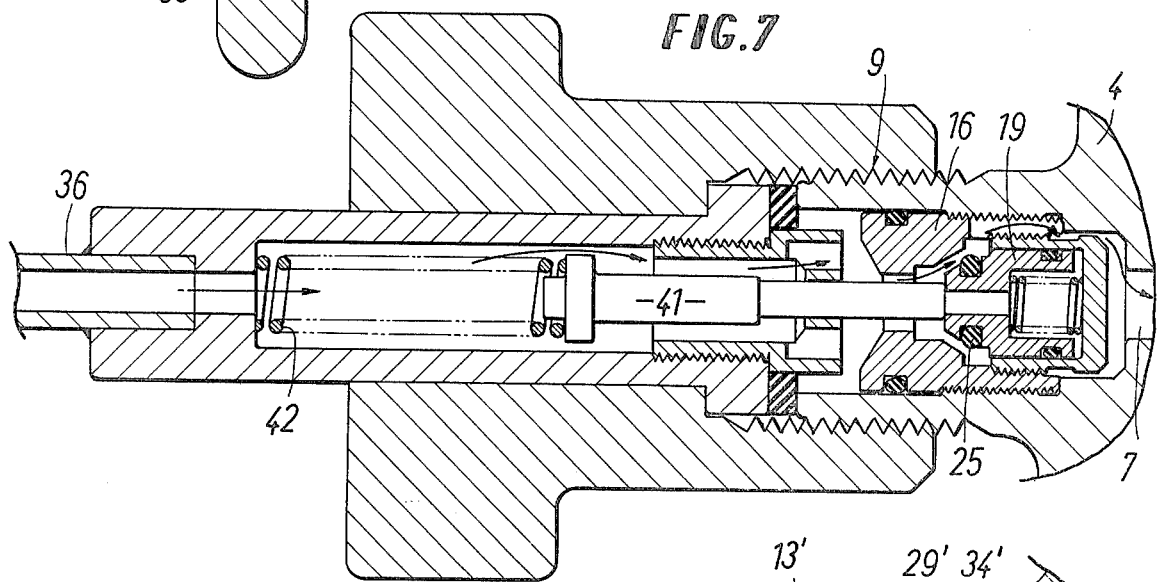
FIG. 7 is an enlarged, axial sectional view showing how the push rod of the filling device of FIG. 6 is effective to shift the check valve body to its open position.

Referring now to FIGS. 6 and 7, a filling device 37 is shown, which includes a collar 39 fitted with a wheel 38, and which is threaded onto the arm 9. The collar 39 carries a flanged sleeve 40 secured to the end of a filler tube 36 within the forward end of which a push rod 41 is telescopically mounted and urged forward by spring 42 of substantially greater strength than the spring 20 of the valve unit 13.

The cylindrical tip of the push rod 41 is smaller in diameter than the outlet bore 30, but larger than the central bore 35. Thus, when the collar 39 is threaded onto the casing arm 9, the forward end of the push rod 41 will engage the front face of the check valve body 19 and will unseat it against the spring 20, as shown in FIG. 7, whereupon filling of the container 1 can proceed. When filling is complete, the collar 39 is removed, and the check valve body 19 will return to its seated, closed position. By having the push rod mounted so it is biased by the spring 42, any possible damage to the check valve body 19 is avoided.

The arrangement just described for opening the valve unit 13 during filling is superior to that necessary for the valve of the prior art, as shown in FIG. 1, in part because the need to pull on the check valve body is avoided. In the arrangement of the invention the check valve body 19 is pushed, not pulled, to effect opening, and this is easier to accomplish from a mechanical standpoint.

Figure 8:
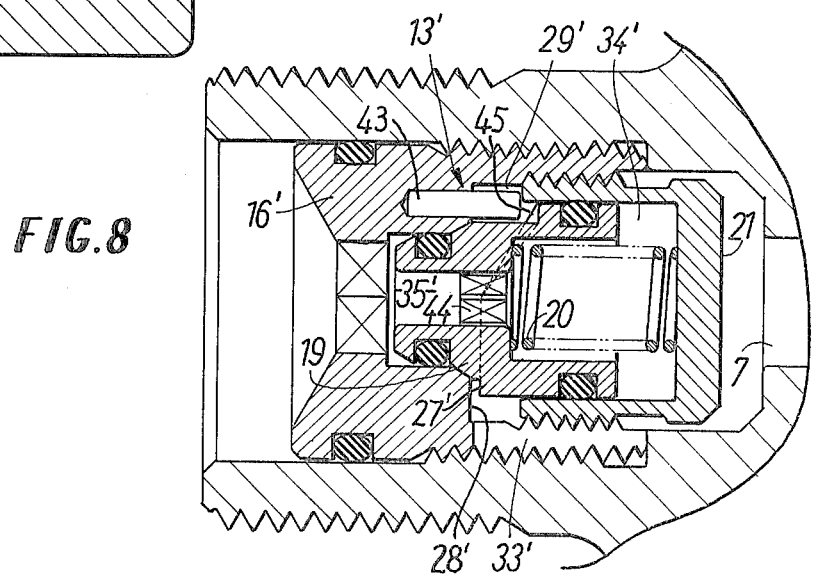
FIG. 8 is an axial sectional view through a second embodiment of the pressure-responsive valve unit of the invention, wherein the check valve body is provided with a cam surface that is engageable with a cylindrical pin carried by the vlve unit main body.

A second embodiment of the pressure-responsive valve unit of the invention is shown at 13' in FIG. 8, such being constructed so it can be operated during a filling operation in the same manner as shown in FIGS. 6 and 7. But in addition, the valve unit 13' can be operated by a suitable turning tool to move its check valve body into an open position.

Referring to FIG. 8, the valve unit 13' includes a main body 16' which is identical to the main body 16, except that the radial wall 28' carries a projecting pin 43 in a socket formed therein. Fluid enters the chamber in the main body 16' through slot openings 33'. Received within the chamber is a check valve body 19'.

The check valve body 19' is like the valve body 19, except for two features. First, the valve body 19' has a swash plate for cam surface 45 formed thereon, which extends over about 90° of the circumference thereof, and which merges into the radial wall 27'. Second, the rear portion 44 of the central bore 35' in the check valve body 19' has an irregular shape, say hexagonal, for receiving a suitable turning tool. By inserting such a tool (not shown) into the bore portion 44 and turning it, the cam surface 45 will ride on the projecting pin 43 and the check valve body 19' will be moved to its open position; if the valve body 19' is rotated sufficiently so that the projecting pin is resting on the annular wall 27', the valve body will be retained in its open condition. When desired, the valve body 19' is rotated in the opposite direction, whereby the coil spring 20 is then effective to close the valve.

The projecting pin 43 can also serve another purpose, if such is desired. Specifically, the length thereof can be related to the degree of compression desired for the coil spring 20. When this is done, the adjuster plug 21 is merely threaded into the sleeve-like main body 16' until it seats on the projecting pin 43, the pin being positioned so that engagement can occur. With the adjuster plug 21 thus seated, the compression spring 20 will exert the desired pressure and the valve will be set to open at the preselected pressure value.

Obviously, many modifications and variations of the invention are possible.

What is claimed is:

1. A valve assembly for attachment to a fluid container, comprising:

a valve casing having a cavity therein, the outer end of said cavity being open, and the inner end thereof being connected to receive fluid from said container; and a pressure-responsive valve unit received within said cavity, said valve unit including:

a sleeve-like main body removably secured within said cavity, said main body having a chamber in the inner end portion thereof opening to the inner end of said cavity, outlet bore means extending from the outer end of said main body to said chamber, and a valve seat disposed about the inner end of said outlet bore means within said chamber;

a cup-shaped adjuster plug removably secured within the open end of said chamber, and including a cylindrical side wall and an end wall;

a check valve body received within said chamber and said cylindrical side wall of said adjuster plug, and slidable into and out of engagement with said valve seat, said check valve body having a central bore therethrough communicating the front end thereof with the region between said check valve body and said end wall of said adjuster plug, and including an abutment face on the front portion thereof adapted to engage said valve seat, and radial wall means spaced rearwardly from said abutment face;

the portion of said check valve body disposed rearwardly of said radial wall means forming a sealed, sliding fit with said cylindrical side wall of said adjuster plug, said check valve body being in sealed engagement with said main body when said abutment face is in engagement with said valve seat, and said inner portion of said main body being provided with passage means for transmitting fluid from the inner end of said cavity to the region of said chamber forwardly of said radial wall means; and spring means positioned between said adjuster plug end wall and said check valve body, arranged to urge said abutment face into engagement with said valve seat, said adjuster plug being adjustable axially of said main body to adjust the pressure exerted by said spring means on said check valve body, whereby said check valve body will normally be in engagement with said valve seat to maintain said valve unit in a closed condition, said check valve body will move toward said adjuster plug end wall against the force of said spring means to open said valve unit when fluid pressure having a greater value than the setting of said spring means is admitted through said passage means and acts on said radial wall means, and said check valve body will be again seated by said spring means to close said valve unit when the value of said fluid pressure falls below the setting of said spring means.

2. A valve assembly as recited in claim 1, wherein the inner end portions of said cavity and said sleeve-like main body are threaded, and the outer end portions thereof are unthreaded and cylindrical, and further including seal means positioned between said unthreaded outer cylindrical end portions of said cavity and said main body.

3. A valve assembly as recited in claim 2, wherein said bore means in said main body is of irregular shape, for accepting a turning tool for use in installing and removing said valve unit.

4. A valve assembly as recited in claim 1, including additionally: first seal means carried by said check valve body on the front end portion thereof, for forming a fluid seal when said abutment face is engaged with said valve seat; and second seal means positioned between the rear portion of said check valve body and the cylindrical side wall of said adjuster plug.

5. A valve assembly as recited in claim 1, wherein the inner end portion of said chamber and the exterior of said cylindrical side wall of said adjuster plug are threaded, and wherein space is provided between said main body and said adjuster plug for applying an adhesive for securing said members against relative rotation.

6. A valve assembly as recited in claim 1, wherein said central bore through said check valve body is aligned with, but is smaller in diameter than said outlet bore means, and said outlet bore means is aligned with the open end of said cavity, whereby the front end of said check valve body can be engaged by a push rod inserted into said cavity and through said outlet bore means, and said check valve body can be moved by said push rod to an open position against the force of said spring means.

7. A valve assembly as recited in claim 1, wherein said check valve body is rotatable and has a cam surface thereon, and including additionally pin means mounted within said chamber of said main body and positioned to engage said cam surface when said check valve body is rotated, said cam surface and said pin means being arranged so that when said check valve body is rotated in a first direction said cam surface and said pin means will interact to effect unseating of said check valve body, and so that when said check valve body is rotated in the reverse direction it will be seated by said spring means, said check valve body central bore being aligned with said bore means in said main body, and having an irregular shape for receiving a turning tool inserted thereinto through said bore means.

8. A valve assembly as recited in claim 1, wherein said passage means in said inner portion of said main body is formed by at least one elongated slot extending axially of said inner portion, and in communication with said chamber.

9. A valve assembly as recited in claim 1, wherein said check valve body includes an enlarged chamber in the rear end thereof for receiving said spring means, said valve body chamber being substantially larger in diameter than said central bore.

* * * * *